2,948,661

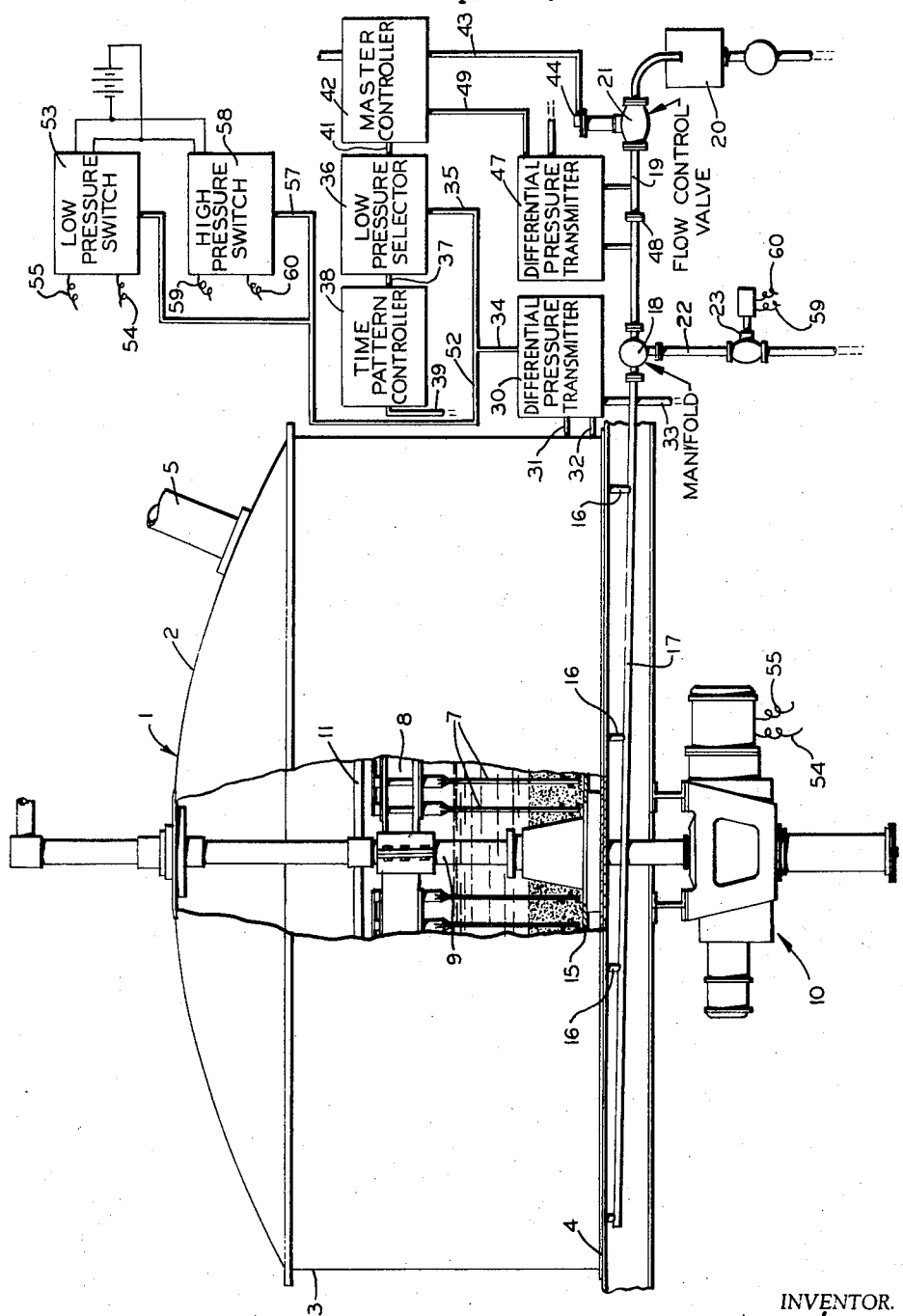

LAUTERING METHOD AND APPARATUS

Paul J. O'Neill, Jr., Sausalito, Calif., assignor to Union Machine Company

Filed Apr. 21, 1958, Ser. No. 729,827

10 Claims. (Cl. 195—134)

This invention relates to the process and apparatus employed in lautering, that is, the straining of wort liquid from mash grains in the manufacture of beer.

Of the numerous operations carried out in brewing, lautering is the most critical and has, heretofore, been characterized by the great amount of skill and experience required by the brewmaster to produce the optimum qualities in the beer without loss of time.

In the lautering operation a relatively large lauter tub is provided in which the infusion of the mash grains is carried out. The lauter tub is provided with a perforated false bottom through which the wort is strained and includes means for introducing water into the tub to obtain the consistency desired.

Heretofore, great skill has been required of the brewmaster in regulating the draw-off rate of the wort through the lauter tub false bottom. If the rate is too great at any point in the lautering cycle excessive filter bed compaction results thereby irreparably damaging the process. On the other hand, if the draw-off rate is too slow an unnecessary extension in the time of the cycle results.

In the event excessive filter bed compaction results it is necessary to cut the grains bed by means of the lauter blades, of, if the condition is severe, to resort to backwashing through the false bottom. Such procedures always result in inefficiency, to say nothing of the resultant impairment in the quality of the wort.

It will be understood that the rate of draw-off to obtain optimum results varies during the lautering cycle because of the many variables involved. Furthermore, the different grades of malt ranging from fancy to standard possess different weight ratios of husks to kernels thereby giving rise to variations of the filter bed structure by changing its average density. Such nonuniformity of the various factors which determine the proper draw-off rate requires each lautering cycle to be closely supervised by the operator when the process is carried out manually.

In general, it may be said that the operator exercises control over the draw-off rate, addition of sparging water, grains cutting and backwashing when changes in various visually observable conditions dictate the necessity of corrective measures. However, the nature of the lautering operation is such that when the corrective measures are taken a permanently damaging time lapse has usually already occurred.

It is the main object of the present invention to provide a method of carrying out the lautering cycle in which automatic control as distinguished from manual control is exercised, thereby permitting changes in controlling variables to be made immediately when required so as to adhere as closely as possible to a perfect lautering cycle.

At this point it should be pointed out that the greatest problem encountered in the lautering operation is compaction of the filter bed. Restriction of the flow of wort through the false bottom is caused by the malt husks arranging themselves across the slots or perforations of the false bottom thereby obstructing such flow. Ordinarily the husks are buoyed up by the fluid mass in the tank but this is offset by the downward viscous drag of the wort tending to carry the husks to the bottom. Thus, although the filter bed is fairly homogeneous beyond a short distance upwardly from the false bottom and the downward velocity of wort is relatively slow, said velocity increases adjacent the false bottom especially when malt husks lie across the slots of the false bottom and reduce the effective slot drainage area. Such velocity increase results in further blocking of the slot area which in turn further increases the wort velocity, and so on. When filter bed compaction becomes excessive the only corrective measures available to free the drain slots of the husks are use of mechanically propelled grains cutting knives, or backwashing.

I have found that a relationship exists between optimum draw-off rate for a perfect lautering cycle and the specific gravity of the wort. In this connection it should be understood that reduction in wort viscosity is the result of gradual dilution of the lauter mash through the addition of sparging water. As the viscosity of the wort decreases it is possible to increase the drawoff rate without causing compaction of the filter bed. On the other hand, as the viscosity increases, the draw-off rate must be reduced to prevent tcompaction of the filter bed. Since it is impractical to directly control draw-off rate in relation to viscosity another method must be found which takes account of the effect of changing viscosity.

It has been found that a direct relationship exists between viscosity of the wort and the differential pressure existing directly above and below the false bottom. By measuring the difference in pressure above and below the false bottom a value of the resistance created by the downward flow of wort is thus arrived at. This is, in effect, a measure of the tendency of the husks to be compacted across the false bottom surface. By the present invention, I take advantage of the above noted differential pressure in automatically regulating the draw-off rate in proportion to the same.

However, the operation is further complicated by the fact that it is necessary to carry out the lautering process during a predetermined time interval of say, three hours, because proper timing with respect to other brewing processes is required. If the lautering process were entirely dependent upon the above noted differential pressure, variations in total process time would result because variations in the raw materials used and slightly varying temperatures would give rise to variations in the viscosity of the wort and consequently effect differing flow characteristics at the false bottom. It is therefore necessary to incorporate in an automatic lautering method some means of completing the cycle in a specified time interval and at the same time take advantage of automatic changes in draw-off rates based on the changes in viscosity of the wort.

As will subsequently be described in greater detail, I achieve such a result by superimposing the rate dictated by viscosity on a rate based on an ideal cycle determined by several trial brews. The ideal cycle may be impressed on a cam profile so that for a typical time cycle of three hours, the rate of draw-off varies in accordance with the variations determined by an expert operator in carrying out a three hour lautering cycle. By "cascading" the rate of flow determined by the time pattern profile I am able to prevent excessive grains bed compaction without lengthening the lautering cycle.

The drawing is a semi-schematic arrangement of a lauter tank and the piping and wiring employed by the present invention.

In detail, the invention is employed with a conventional lauter tank generally designated 1 having a domed top 2, circular sidewalls 3 and a bottom 4. A conduit 5 connected with the top 2 is provided through which the material from the malt tun (not shown) is discharged into the tank 1.

The usual grains cutting blades 7 are provided supported on horizontally extending arms 8 which are rotated by a central revolvable shaft 9 driven by gear motor generally designated 10. Sparging pipes 11 for supplying water to the tank may be carried by arms 8. The above noted structure is conventional and no claim is made to the same except in combination with the invention herein claimed.

Spaced above the bottom 4 is a false bottom 15 which is provided with relatively small slots through which the wort is drained. Connected with bottom 4 are a plurality of outlet pipes 16 leading to a plurality of drain pipes 17 which in turn are connected to a manifold 18 from which the wort is conveyed by a single pipe 19 to a grant 20 where the quality of the beer may be observed. Flow control valve 21 is provided in line 19.

The above piping arrangement differs from that heretofore employed with conventional manual systems in that a single pipe 19 is employed to carry all of the wort so that the entire flow may be regulated by valve 21.

To permit backwashing when required a fresh water pipe 22 is connected to manifold 18 and flow of water therethrough is controlled by a solenoid valve 23, the control of which will be described later on.

By the present invention the difference in pressure existing above and below the false bottom 15 is registered on a conventional differential pressure transmitter 30 connected by conduits 31, 32, to the interior of tank 1 at points respectively above and below the false bottom 15. Transmitter 30 is supplied with air through a conduit 33 and is of the type which transmits air through output conduit 34 at a pressure proportional to the differential pressure sensed by it.

The transmitted air pressure signal from transmitter 30 is conveyed through conduit 35 to a conventional low pressure selector 36 which is of the type that transmits the lesser of two pressure signals received by it. Low pressure selector 36 also receives through conduit 37 an air pressure signal from a conventional time pattern transmitter 38 that is actuated by a cam of predetermined shape to transmit a pressure corresponding to the rate of flow at any point in an ideal lautering cycle. Except for the fact that time pattern transmitter 38 transmits varying signals based on a predetermined cam contour it is similar to transmitter 30 and is provided with an air supply conduit 39 to provide a source of uniform air pressure.

The air pressure signal received from the low pressure selector 36 is conducted through conduit 41 to a conventional master controller 42 which in turn is connected by line 43 to a conventional spring operated diaphragm mechanism 44 carried by valve 21. It will be understood that the maximum valve opening dictated by the above arrangement is such as to prevent grains bed compaction beyond a predetermined amount. Howevr, because of the presence of the time pattern controller the draw-off rate at no time is permitted to fall below a rate that will prevent completion of the lautering operation within the predetermined cycle time. The cam profile on the time-rate controller 38 may be established from a number of flow rate patterns taken from successful brews. From the above it is seen that the time pattern controller 38 establishes a "set point" for any particular moment in the lautering cycle, and the differential pressure transmitter insures that the draw-off rate is not less than the maximum amount possible without causing a damaging increase in filter bed compaction.

Furthermore, the differential pressure transmitter functions to initiate grains cutting and backwashing when required.

Master controller 42 is also connected by means of a conduit 49 to a second differential pressure transmitter 47 which is connected to opposite sides of a convention flow measuring orifice 48 in drain line 19. The operation of master controller 42 is such that it senses the difference between the signals emanating from low pressure selector 36 and the flow measuring transmitter 47. The action of controller 42 thus correlates the opening of draw-off valve 21 to the actual rate of flow through drain line 19. If the level of the liquid in lauter tank 1 were not variable it would be possible to obtain automatic operation without the second differential pressure transmitter 47. However, since changing levels in tank 1 cause changing pressures in the wort it is not possible to base control on absolute valves and it is therefore necessary to sense the difference between the actual flow through drain pipe 19 and the possible flow determined by differential pressure transmitter 30.

It is, of course, possible to hold the water level in tank 1 at a uniform height to cover the grains bed by means of an automatic level control gauge controlling the inflow of sparging water. In such a case the second differential pressure transmitter 47 may be obviated.

It may be repeated here that one of the important requirements of a successful lautering cycle is that when filter bed compaction dictates the need for corrective action with respect to the draw-off rate, such action should be taken immediately. One of the glaring weaknesses of present manual control methods is the inability of the operator to take corrective action soon enough to prevent permanent damage. Although by the present invention the need for drastic action in freeing obstruction of the false bottom by husks is minimized, nevertheless, when the grains bed compaction becomes so severe that it would be impossible to complete the cycle in the permissible time the present invention permits the immediate start of grains bed cutting to correct the compaction. If the compaction is so severe as to require backwashing, this also is accomplished automatically without delay.

To this end, the output signal from the differential pressure transmitter 30 is also connected by lines 34 and 52 to a diaphragm actuated electric switch 53 that in turn is connected by leads 54, 55 to the gear motor 10. As a practical matter, the pneumatic signal transmitted by the various transmitters herein described may range in pressure from about three to fifteen pounds per square inch although a range of from about three to eight or nine pounds per square inch would correspond to the normal differential pressures registered by transmitters 30, 47. By setting the pressure actuated switch 53 for actuation at a relatively high pressure, say ten pounds per square inch, said switch is closed only when the differential pressure registered by transmitter 30 is high enough to indicate that grains cutting is required to free the false bottom from the obstruction of the husks. Therefore, upon actuation of switch 53, gear motor 10 is started to rotate shaft 9 and drive the grains cutters 7 through their circular paths of travel supported on arms 8. Such grains cutting continues until the differential pressure at the false bottom is reduced to such an extent as to open switch 53.

In the event the grains bed compaction is so severe that only backwashing can rectify the impairment of drainage, this fact is registered by an even greater differential pressure being indicated by transmitter 30 and by a signal of even stronger pressure emanating therefrom. Connected with conduit 52 by pipe 57 is another pneumatically actuated switch 58 which is set at a still higher pressure level than switch 53; for example, it may be set at about fifteen pounds per square inch. This switch 58 is connected by leads 59, 60 to the solenoid 61 of the solenoid actuated valve 23 which is in the fresh water backwash line 22 hereinbefore described.

If the grains bed compaction becomes so great as to require backwashing to free the perforated false bottom of husks this fact is manifested by the relatively high differential pressure registered by transmitter 30 and its transmitted signal. If the pressure of said signal becomes so great as to actuate the high pressure switch 58, the circuit through leads 59, 60, is completed to actuate solenoid 61 and open valve 23 thereby effecting backwashing. A time delay relay of conventional design may be incorporated in solenoid 61 to keep valve 22 open for a predetermined length of time.

To obtain all the values possible from the mash it is desirable to start the lautering cycle with a mixture of relatively high concentration so that the viscosity of the wort is also relatively high. Since grains bed compaction is a direct function of viscosity, the automatic control permitted by the present invention prevents draw-off at too rapid a rate which might accelerate compaction. On the other hand, as sparging water is added to dilute the wort the above described control permits the draw-off rate to increase automatically and at the same time prevent the velocity of flow adjacent the false bottom from increasing to such an extent as to compact the husks.

It will be apparent that the above described automatic control minimizes the need for grains cutting and backwashing with their attendant reduction in efficiency of the process.

It should be understood that the invention is not restricted to the specific steps and apparatus herein disclosed for illustrative purposes but is intended to include in its scope minor variations in design and operation coming within the terms of the following claims.

I claim:

1. In combination with a lauter tank having a perforated false bottom for draining wort therethrough, filter bed compaction measuring means responsive to the differential pressure existing between points above and below said false bottom, means for registering a predetermined ideal wort flow rate at any time during the lautering cycle, signal means for transmitting signals from said measuring and registering means at magnitudes proportional to the values of said differential pressure and said ideal flow rate respectively, control means for varying the wort draw-off rate, said control means being responsive to the one signal from said measuring means and registering means that corresponds to the greater rate of flow.

2. In combination with a lauter tank having a perforated false bottom for draining wort therethrough, first measuring means for measuring the differential pressure of said wort at points above and below said false bottom, means for transmitting a signal from said measuring means of an intensity proportional to said differential pressure, means for establishing a rate of flow corresponding to an ideal rate of flow at any point in a lautering cycle, selector means for selecting the differential pressure of said first and second measuring means that is greater, and means for causing the actual flow rate to equal a rate corresponding to said greater differential pressure.

3. In combination with a lauter tank having a perforated false bottom for draining wort therethrough, a differential pressure indicator for indicating at any point in the lautering cycle the differential pressure of said wort at points above and below said false bottom, a controller for indicating at any point in the lautering cycle a differential pressure corresponding to the rate of flow in an ideal cycle, selector means for selecting at any point in the lautering cycle the lesser of the two differential pressures indicated by said indicator and controller, and flow governing means for adjusting the actual rate of flow to correspond with said lesser of the two differential pressures.

4. In combination with a lauter tank having a perforated false bottom for draining wort therethrough, a differential pressure indicator for indicating at any point in the lautering cycle the differential pressure of said wort at points above and below said false bottom, a controller for indicating at any point in the lautering cycle a differential pressure corresponding to the rate of flow in an ideal cycle, selector means for selecting at any point in the lautering cycle the lesser of the two differential pressures indicated by said indicator and controller, and flow governing means for adjusting the actual rate of flow to correspond with said lesser of the two differential pressures, means actuated by said differential pressure for initiating grains cutting in said tank when said differential pressure exceeds a predetermined amount.

5. In combination with a lauter tank having a perforated false bottom for draining wort therethrough, a differential pressure indicator for indicating at any point in the lautering cycle the differential pressure of said wort at points above and below said false bottom, a controller for indicating at any point in the lautering cycle a differential pressure corresponding to the rate of flow in an ideal cycle, selector means for selecting at any point in the lautering cycle the lesser of the two differential pressures indicated by said indicator and controller, and flow governing means for adjusting the actual rate of flow to correspond with said lesser of the two differential pressures, means actuated by said differential pressure for initiating grains cutting in said tank when said differential pressure exceeds a predetermined amount, and means actuatable by said differential pressure for backwashing said perforated false bottom when said differential pressure exceeds another predetermined amount in excess of said first mentioned predetermined amount.

6. In combination with a lauter tank having a perforated false bottom for draining wort therethrough by gravity, a drain conduit for conveying said wort from said tank and a valve in said conduit for regulating the amount of flow therethrough, a differential pressure transmitter connected to said tank at points above and below said false bottom for transmitting a pressure signal directly proportional to the differential pressure between said points at each point in a lautering cycle, a time pattern controller for transmitting a pressure signal directly proportional to the differential pressure corresponding to the rate of flow at each point in an ideal lautering cycle, selector means for selecting the lesser of two pressure signals transmitted by said transmitter and said controller and for transmitting said lesser signal, and means actuated by the signal from said selector for actuating said valve to increase or decrease the rate of flow through said conduit depending on the magnitude of said last mentioned signal.

7. In combination with a lauter tank having a perforated false bottom for draining wort therethrough by gravity, a drain conduit for conveying said wort from said tank and a valve in said conduit for regulating the amount of flow therethrough, a differential pressure transmitter connected to said tank at points above and below said false bottom for transmitting a pressure signal directly proportional to the differential pressure between said points at each point in a lautering cycle, a time pattern controller for transmitting a pressure signal directly proportional to the differential pressure corresponding to the rate of flow at each point in an ideal lautering cycle, selector means for selecting the lesser of two pressure signals transmitted by said transmitter and said controller and for transmitting said lesser signal, and means actuated by the signal from said selector for actuating said valve to increase or decrease the rate of flow through said conduit depending on the magnitude of said last mentioned signal, a first switch actuated by the pressure signal from said differential pressure transmitter for initiating grains cutting in said tank when said differential pressure exceeds a predetermined amount.

8. In combination with a lauter tank having a perforated false bottom for draining wort therethrough by gravity, a drain conduit for conveying said wort from said tank and a valve in said conduit for regulating the amount of flow therethrough, a differential pressure transmitter connected to said tank at points above and below said false bottom for transmitting a pressure signal directly proportional to the differential pressure between said points at each point in a lautering cycle, a time pattern controller for transmitting a pressure signal directly proportional to the differential pressure corresponding to the rate of flow at each point in an ideal lautering cycle, selector means for selecting the lesser of two pressure signals transmitted by said transmitter and said controller and for transmitting said lesser signal, and means actuated by the signal from said selector for actuating said valve to increase or decrease the rate of flow through said conduit depending on the magnitude of said last mentioned signal, a first switch actuated by the pressure signal from said differential pressure transmitter for initiating grains cutting in said tank when said differential pressure exceeds a predetermined amount, means for conducting water in a reverse direction through said conduit into said tank, and a second switch connected to said last mentioned means for initiating such backwashing when said differential pressure exceeds a predetermined amount in excess of said first mentioned predetermined amount.

9. In combination with a lauter tank having a perforated false bottom for supporting a charge of mash thereon and through which the wort drains by gravity, said tank being provided with grains cutting mechanism for agitating said mash, a drain conduit for conveying said wort from said tank and a valve in said conduit for regulating the flow through said conduit, a first differential pressure transmitter connected to said tank and points above and below said false bottom for transmitting a pressure signal of an intensity directly proportional to the differential pressure between said points at each point in a lautering cycle, a time pattern controller for transmitting a pressure signal directly proportional to the differential pressure corresponding to the rate of flow at each point in an ideal lautering cycle, selector means for selecting the lesser of said two pressure signals transmitted by said first transmitter and said controller and for transmitting the lesser signal, a flow measuring element in said conduit for measuring the volume of flow therethrough, a second differential pressure transmitter connected to said element for transmitting a signal in proportion to the rate of flow through said element, a controller actuated by the signals from said selector and said second differential pressure transmitter for actuating said valve to increase or decrease the rate of flow therethrough.

10. In combination with a lauter tank having a perforated false bottom for draining wort therethrough, means for collecting said wort, and a conduit connected with said collecting means for drawing off said wort, a valve in said conduit and means for controlling the opening of said valve in response to a signal, a differential pressure measuring device connected with the wort in said tank at points respectively above and below said false bottom for measuring the difference in wort pressure at said points, means for transmitting a signal from said device to said valve control means having an intensity directly proportional to the differential pressure registered by said device, and said valve control means operating to open said valve wider when the intensity of said signal decreases in response to a reduction in said differential pressure.

References Cited in the file of this patent

UNITED STATES PATENTS

| | | |
|---|---|---|
| 2,758,030 | Metz | Aug. 7, 1956 |
| 2,768,897 | Paine | Oct. 30, 1956 |